March 20, 1962   W. A. KIVELL   3,025,966
LIQUID CLARIFYING APPARATUS
Filed July 29, 1959   2 Sheets-Sheet 1

*INVENTOR:*
Wayne A. Kivell
BY
Arthur Middleton
ATTY.

March 20, 1962 W. A. KIVELL 3,025,966
LIQUID CLARIFYING APPARATUS
Filed July 29, 1959 2 Sheets-Sheet 2
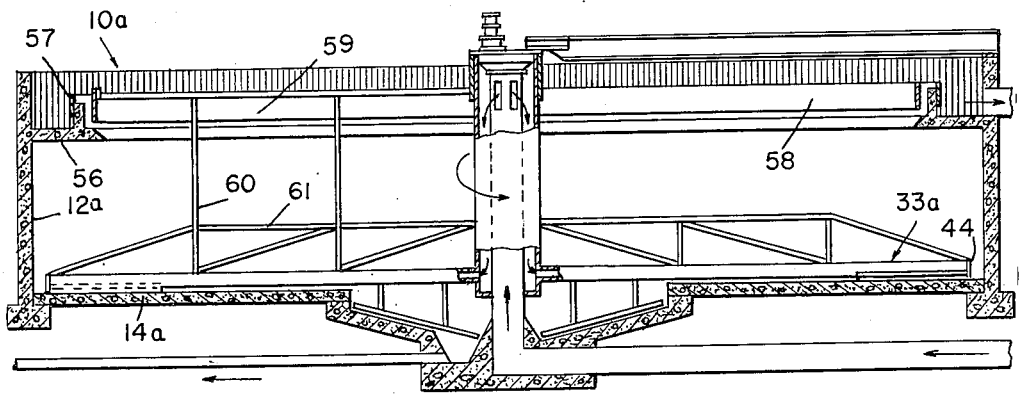
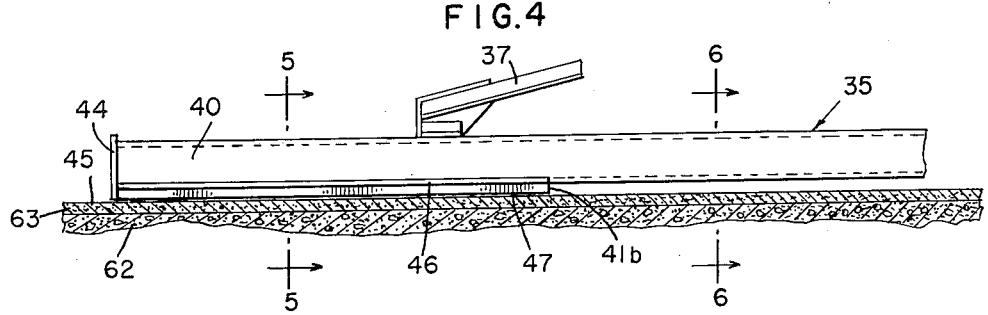
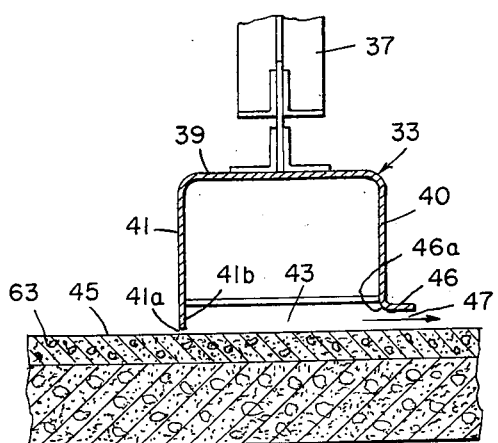
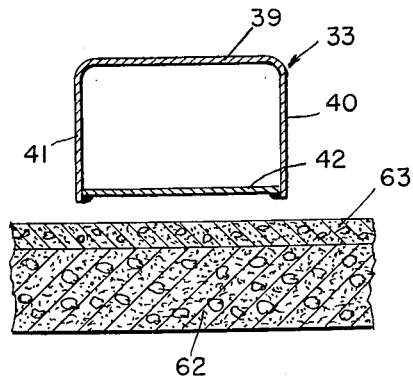
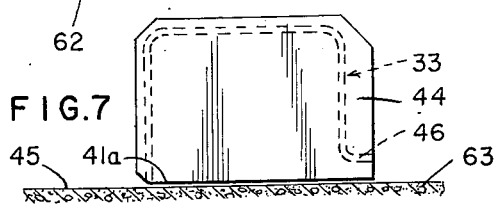
INVENTOR.
Wayne A. Kivell
BY
Arthur Middleton
ATTY.

United States Patent Office 3,025,966
Patented Mar. 20, 1962

3,025,966
LIQUID CLARIFYING APPARATUS
Wayne A. Kivell, 25 Sagamore Road, Bronxville, N.Y.
Filed July 29, 1959, Ser. No. 830,245
11 Claims. (Cl. 210—520)

This invention relates to improvements in apparatus of the type used for the clarification of turbid liquids such as sanitary sewage, industrial wastes and water carrying solids in suspension, either in its raw state or during a treatment process where the clarification of a turbid liquid is a requisite of one or more steps in the treatment process.

A general or broad object of the present invention is to provide a new and novel apparatus for use in combination with complemental liquid holding tanks for the improvement of the clarification efficiency of sedimentation units. More particularly it is an object of the invention to provide a new and improved means of delivering the turbid liquid into the holding tank so that the feed will be continuously and evenly distributed over the entire tank bottom feed area by controlled mechanical and hydraulic means.

In the operation of sedimentation apparatus for the clarification of turbid liquids of the character hereinbefore set forth, the types of feed distributing means at present generally used for the delivery of the liquid into the holding tanks are such that clogging of the distributing means can occur. It is accordingly another object of the invention to provide a new feed distributing means which is so constructed that it will continuously free itself of solids of the character of rods, stringy or fibrous material, which experience has demonstrated will cause clogging of multiple ports or orifices if present or used in distributing means for similarly controlling an influent feed containing such solids.

Still another object of the invention is to provide a new and improved feed distributing means which is designed or constructed in such a manner that it will continuously flush the feed area of the tank bottom with turbulent influent which, combined with the rotation of the distributing means, will provide agitation sufficient to effect the movement of settleable solids to a quiescent settling zone in the central portion of the tank.

A still further object of the invention is to provide an improved tubular distributing arm having a novel and improved bottom feed for effecting the introduction of influent under the sludge blanket as developed and used in the upward-flow solids contact type of treatment and clarification in the activated sludge process of sewage treatment and for the high rate cold lime-soda process of water softening.

More specifically with respect to the feed distributing means there is provided a tubular feed arm wherein a length of the outer end thereof is provided with a bottom opening, the arm at one side of the opening having the wall extending down to and moving over and in close proximity to the bottom or floor of the tank while the opposite wall terminates a substantial distance above the tank floor and is forwardly extended to provide a guide lip, the arm in the operation of the apparatus moving in the direction in which the opening bordering lip extends whereby as the influent liquid passes out in the direction of the movement of the arm, the trailing side or wall of the arm at the outlet or open bottom will function as a back hoe for collecting solids settled on the floor and effect the mixing of the same into the influent feed.

Other objects and advantageous features of the invention will become apparent hereinafter, wherein the preferred form of the apparatus is disclosed in conjunction with a suitable complemental liquid holding tank. As illustrative of certain embodiments of apparatus in the fields to which the invention relates, reference is made to the accompanying drawings constituting a part of the specification.

In the drawings:
FIG. 1 is a partial top plan of the preferred form of apparatus and liquid holding tank with centrally located effluent launder and illustrating the improved distributing means of the present invention, with portions of the structure broken away;

FIG. 4 is a view in elevation of the front or advancing side of an arm of the flow distributing apparatus, the same being on an enlarged scale;

FIG. 5 is a sectional view taken substantially on the line 5—5 of FIG. 4;

FIG. 6 is a sectional view taken substantially on the line 6—6 of FIG. 4;

FIG. 7 is a view looking at an end of an arm with a portion of the underlying floor being in section;

FIG. 8 is a view corresponding to sectional view FIG. 2 of a preferred form of apparatus equipped with a scum skimmer and a liquid holding tank with peripherally located effluent launder and scum plate the combination of which is particularly applicable to realizing the present invention for the clarification of raw sewage and other turbid liquids carrying both settleable and floatable solids.

Figure 1:
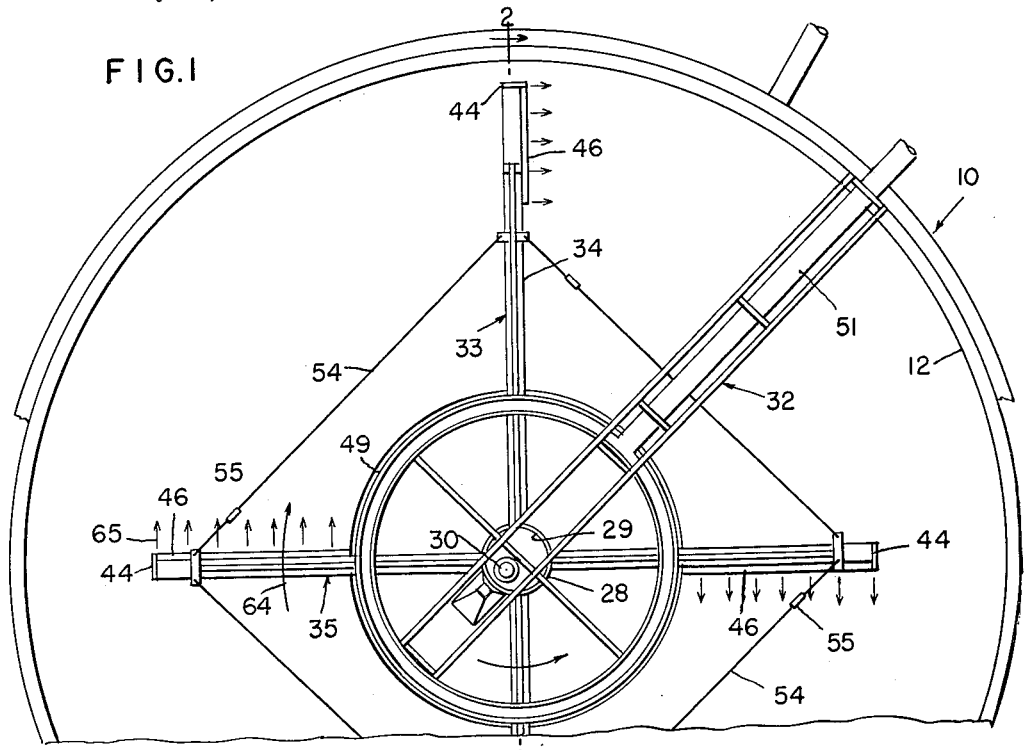

Referring now more particularly to the drawings and especially to FIGS. 1 to 7, inclusive, there is illustrated a liquid holding tank 10 of generally circular outline having the side wall 12 and bottom 14 extending inwardly with a flat or downwardly sloping top surface leading to a central cone-shaped sludge receiving well 16. The sloping bottom of the well 16 at one side of the well leads into or discharges into a sludge pocket 18.

Communicating with the pocket 18 and leading therefrom is a sludge withdrawal conduit or pipeline 20.

Extending into the bottom part of the tank structure beneath the well 16 is a feed supply conduit 22 and rising from the center of the well is a vertical tubular column 24 which at its top end is provided with a number of outlet apertures 25 through which influent flow is directed to the interior of the drum 26 of the distributing means which encircles and is concentric with the riser column and which rotates about the column as hereinafter described.

The vertical tubular riser column 24 functions as a supporting pier for the rotating flow distributing means about to be described.

Upon the column 24 at the top thereof is mounted a turntable base 27 which supports a ball bearing turntable top 28 which carries an internal ring gear 29.

Mounted in conventional manner above the turntable and ring gear is a combined motor and speed reducer unit which is generally designated 30, the speed reducer being operatively coupled by a driving pinion, not shown, with the ring gear 29.

The drum 26 is attached to the turntable top 28 and suspended therefrom by means of the rigid hangers 31 and through the medium of this suspended rotating drum 26 the hereinafter described flow distributing means is rotated.

The numeral 32 generally designates an operator's bridge and electric current is supplied to the driving motor which is connected to the speed reducer, by electric wiring carried in a conduit, not shown, attached to this bridge.

Connected to and radiating from the lower end of the revolving drum 26 are a number of distributing arms each of which is generally designated 33. Four such arms are here illustrated and certain ones thereof are of substantially greater length than the other, the longer arms being designated 34 while the shorter arms are designated 35. The inner ends of the arms have open flow connections 36 with the drum shown in FIG. 2 whereby influent flow emerging from the ports 25 at the upper end of the tubular riser or center column 24, passes downward for radial distribution in the tank by way of the arms 33.

Except for the fact that the arms 33 are alternately long and short, as illustrated, they are of similar construction and accordingly a description of one will apply to all.

The arms 33 are held in fixed vertically spaced relation to the surface of the tank bottom 14 by means of the rigid structural bracing 37 which connects the arms, as illustrated, to the drum 26.

The lower end of the drum 26 carries a sealing means 38 between the same and the fixed riser column 24 to substantially close the space between the column and the lower portion of the drum.

While the distributing arms have been illustrated and described as being of different lengths, as shown, they are otherwise of the same form or construction and accordingly a description of one will be applicable to all.

Upon reference to FIGS. 4 to 7, inclusive, it will be seen that the distributing arm has in addition to the top wall 39, the longitudinal side walls 40 and 41 and a bottom wall 42. The bottom wall 42 terminates at its outer end a substantial distance short of the outer end of the tubular arm thereby providing a bottom discharge opening 43.

The outer end of the arm is closed by the vertical end plate 44 and between this end plate 44 and the outer end edge of the bottom wall 42, the back wall 41 extends downwardly beyond the bottom wall 42 and into close proximity to the surface 45 of the tank bottom.

The wall 40 of the arm in the portion thereof lying between the outer end of the bottom wall 42 and the plate 44 closing the outer end of the arm, has an outturned lip or flange 46 which is here shown as being approximately at the level of the bottom wall 42, but is not limited to this positioning, providing an emergency space or flow passage 47 for the material which is caused to flow outwardly through the arm. By the provision of this outwardly turned flange 46 along the upper side of the outflow space or passage 47, a rounded edge 46ᵃ borders the passage, which prevents the catching of stringy material as such material flows through the passage.

The end plate 44 which is secured to the outer end of the arm extends below the level of the bottom wall 42 to a working clearance with the floor surface 45 of the tank bottom to cut off the flow in the arm from passing radially outward.

Liquid level is established within the holding tank at the line 48 by flow of clarified effluent over horizontal weirs 49 into the collecting launder 50 and thence to discharge from the tank through the radial effluent flume 51 which is hung or suspended from the operator's bridge 32.

Solids settleable from the turbid influent enter a quiescent liquid zone above the sludge receiving well 16 and are settled into it to form sludge.

Rigidly attached to the flow distributing arms 33 by hangers 52 are radially extending sludge scrapers 53 which parallel the conical bottom of the sludge receiving well in a manner to deliver sludge into the pocket 18 from which it will pass into the withdrawal conduit 20.

In the use of two long and two short arms here illustrated, each of which is of the same design or construction through an outer or terminal length thereof, as described and illustrated in FIGS. 4 to 7, whereby the influent feed is discharged over that surface of the tank bottom which is traversed by the outflow passage 47, there will be given two complete coverages of the influent feed over the tank bottom with each revolution of the flow distributing apparatus.

Any number of arms and arrangement of the bottomless feed sections leading to the outlet orifices may be used, providing that the influent flow receives substantially uniform distribution over the designated feed area.

The flow distributing arms, generically designated 33, are held fixed in a horizontal pattern by the use of tie rods 54 commonly drawn taut by means of turnbuckles 55.

Figure 2:
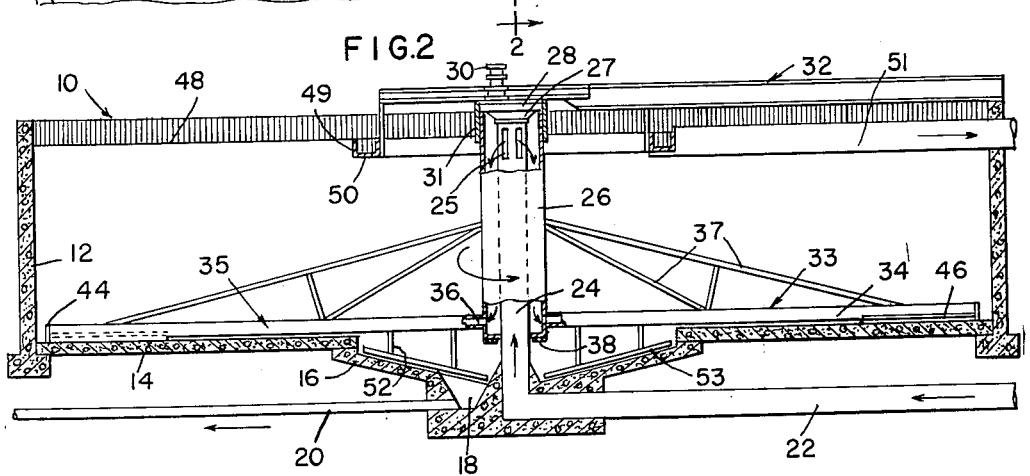
FIG. 2 is a transverse sectional view taken in the vertical plane substantially on the line 2—2 of FIG. 1.
Figure 3:
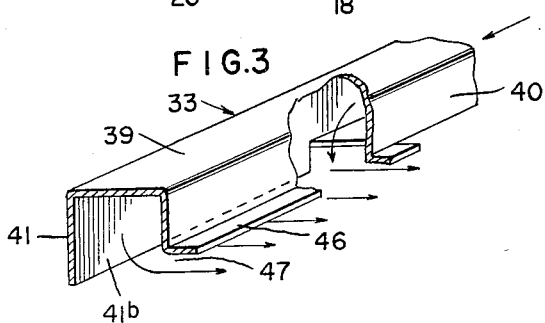
FIG. 3 is a detail perspective view on an enlarged scale of the outer end portion of a feed distributing arm with portions broken away and with arrows illustrating the direction of flow of material therefrom during the rotary movement of the arm.

FIG. 8 is a sectional view of a preferred form of apparatus, corresponding to FIG. 2, which is equipped with scum skimmer and liquid holding tank with peripherally located effluent launder and scum plate. In this figure there is shown a liquid holding tank 10ᵃ similar to the tank 10 and having the side wall 12ᵃ and the floor or bottom 14ᵃ. The numeral 56 generally designates the effluent launder which circles the inner surface of the wall 12ᵃ adjacent to the top thereof and which launder is equipped with the effluent weir plate 57 and the scum retaining baffle 58. The rotating feed distributing means is equipped with a scum skimming blade 59 which is at an elevation to extend above and below the liquid surface and is held in position by vertical struts 60 which are rigidly fixed into the arm truss bracing 61.

At a suitable position around the periphery of the tank a section of the effluent launder 56 is formed or developed into a scum receiving box and means is provided, either manual or automatic, for withdrawing collected scum. No illustration of this latter structure is given as this is conventional. In operation, floatable solids rise to the surface and by the action of surface liquid and air currents collect generally adjacent to the scum baffle 58. The skimming blade 59 pushes the scum to a position in front of the scum receiving box where it can be drawn over a shallow weir wall by opening a drain valve in the box.

In this FIG. 8 the distributing arms are generally designated 33ᵃ and are of the same construction as the arms 33 and the other elements of the apparatus shown in this figure are of the same construction as has been described in connection with that shown in FIGS. 1 and 2 and accordingly repetition of the descriptive matter is not believed to be essential to an understanding of the operation of the form of the apparatus shown in FIG. 8.

As hereinbefore described, the bottom edge of one side of each arm, here designated as the side 40, is spaced above the finished floor 45 for a length of the open bottom section to form an outflow passage to discharge turbid influent over that feed area of the tank bottom. The bottom edge of the other side or wall of the arm, here designated as the side 41, encloses a third side of the rectangular bottomless arm section which forms the bottom opening 43 and this bottom edge of wall 41 is spaced above the finished floor 45 to give working clearance only between the moving arm and the tank bottom. In order to provide a finished surface to the tank bottom that will fit the plane or cone of rotation formed by the bottom edge of the arm wall 41, a concrete base 62 is first constructed to approximate shape and grade and after installation and final adjustment of the rotating mechanism, a mortar coat 63 is added and swept into place using screed boards attached to the arms. In this manner a true fit can be obtained between the bottom edges of the portion of each back wall 41 which extends below the bottom wall 42 and to a working clearance above the finished floor 45.

In the operation of the apparatus the direction of rotation is indicated in FIG. 1 by arrows 64. This direction of rotation is the direction in which the arms discharge the liquids containing solids from the outflow passage 47. The direction of such discharge is designated in FIG. 1 by the arrows 65. This admission of feed to the tank bottom from one side only of the arms is preferable for liquids containing solids of the character of rods, stringy or fibrous material, as it provides a maximum flow passage for controlling a given flow into the tank while the opposite side of the arm along the length of the outlet opening 47 with a clearance as at 41ᵃ between the extended portion of the wall 41, provides a back hoe 41ᵇ for collecting solids settled on the tank floor and mixing them into the influent feed.

Flow passages similar to 47 may be used on both sides of the arm to provide a split feed if the turbid liquid carries fine solids of a character and specific gravity which can be readily flushed from the tank floor and transferred to the settling zone over the sludge receiving well 16.

FIG. 4 illustrates the length of the bottom feed portion of an arm and its relation to the tank bottom. The length of the flow passage 47 in each distributing arm is selected to give even distribution of the influent feed in a unit of quantity per unit of bottom feed area substantially without overlap or omission between the concentric bottom areas passed over by adjacent arm flow passages and together to cover the whole bottom feed area of the tank.

From the foregoing it will be seen that there is provided by the present invention a new and novel form or construction of influent feed distributing arms which will be recognized by those versed in the art as embodying many features of advantage over the types of distributing arms at present employed in liquid clarifying apparatus.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. In liquid clarifying apparatus, a liquid holding tank having a floor and a centrally located sludge receiving well, a centrally located rotatable and hollow influent receiving unit, means for introducing turbid liquid into said unit, means for carrying off clarified liquid effluent from the top of the tank, means for removing sludge from said well, and tubular flow distributing arms joined to and extending radially from said unit to rotate therewith and carry influent outwardly therefrom and said arms each having an outer end longitudinally extending continuous, bottomless and unrestricted outlet portion, said arms each defining an outer end longitudinally extending continuous and unrestricted opening facing in the direction of rotation of the associated arm so as to discharge unrestrictedly and non-cloggingly the influent directly downwardly toward the underlying floor surface and also laterally in the direction of rotation of the associated arm.

2. In liquid clarifying apparatus, a liquid holding tank having a floor and a centrally located sludge receiving well, means for conducting collected sludge away from the well, a tubular standard rising from the center of the well a substantial distance above the tank floor, a hollow influent receiving unit encircling the tubular standard and supported thereby for rotation therearound, the tubular standard having openings leading therefrom into said unit, means for conveying influent into the hollow standard, means for conducting clarified effluent from the upper part of the tank, and a plurality of tubular distributing arms joined to and radiating from said hollow unit for rotation in one direction therewith and positioned superjacent the floor and each arm having a bottomless terminal length and at least one side terminating a distance short of the floor to form with the floor an outlet passage.

3. The invention according to claim 2, with a flange bordering the top of the said outlet passage and projecting forwardly from the arm.

4. The invention according to claim 2, wherein said outlet passage extends uninterruptedly the full extent of the said bottomless terminal length of the arm.

5. In liquid clarifying apparatus, a liquid holding tank having a floor and a centrally located sludge receiving well, means for conducting collected sludge away from the well, a tubular standard rising from the center of the well a substantial distance above the tank floor, a hollow influent receiving unit encircling the tubular standard and supported thereby for rotation therearound, the tubular standard having openings leading therefrom into said unit, means for conveying influent into the hollow standard, means for conducting clarified effluent from the upper part of the tank, and a plurality of tubular distributing arms joined to and radiating from said hollow unit for rotation in one direction therewith and positioned superjacent the floor and each arm having a bottomless terminal length and the arm having the advancing side thereof terminating a distance short of the floor to form an outlet passage for discharge of liquid in the direction of rotation of the arm.

6. The invention according to claim 5, wherein said outlet passage extends uninterruptedly the full extent of the said bottomless terminal length of the arm with means forming a hoe on the opposite side of the arm from said passage and of the same length as the passage, the hoe having a bottom edge lying in a plane below the top edge of the passage and closely adjacent to the floor surface.

7. A liquid distributing arm structure for use in a holding tank of a liquid clarifiying apparatus, said arm consisting of a tubular body having a bottom side which is directed downwardly when the arm is in use, the arm body having an inner end into which liquid is introduced and an outer end, a terminal length of the outer end having its under side bottomless and open to form a downwardly directed continuous outlet area of substantial extent and unrestricted so as to be non-clogging, and the arm body having at the outer end a continuous unrestricted lateral flow-directing means in communication with and extending the length of said downwardly directed outlet.

8. A liquid distributing arm structure for use in a holding tank of a liquid clarifying apparatus, said arm consisting of a tubular body of polygonal cross section providing a bottom wall and adjoining side walls, the arm body having an inner open end and a closed outer end, a terminal outer end length of the arm body having the bottom wall terminating short of the said closed outer end forming a downwardly directed outlet, one side wall extending beyond the plane of the bottom wall along the length of said outlet to form a hoe blade, and the side wall opposite from said one side wall having an outwardly projecting bottom edge bordering flange lying in a plane above the free bottom edge of the said hoe blade and having a length approximately the same as the hoe blade.

9. In a liquid holding tank having a floor and surrounding wall, a plurality of distributing arms, means supporting the arms in a radial array over and in vertically spaced proximity to the surface of said floor and for rotation about a vertical axis, means for conveying influent to and through said arms from the central part of the array, and each of said arms having an outer end terminal length made bottomless for non-clogging and unrestricted direct downward discharge of the influent upon the underlying floor with means forming with the underlying floor surface, a continuous unrestricted lateral flow passage facing in the direction of rotation of the associated arm so as to discharge unrestrictingly and non-cloggingly the influent laterally in the direction of rotation of the associated arm.

10. The invention according to claim 9, wherein each of said arms includes a flange projecting laterally from a side of the arm along the extent of said outer end terminal length.

11. In a liquid clarifying apparatus, a liquid-holding tank having a floor and a centrally located sludge-receiving well, means for conducting collected sludge away from the well, a rotatably mounted hollow influent-receiving unit disposed in the central portion of said tank, means for conveying influent into the receiving unit, means for conducting clarified effluent from the upper part of the tank, and a plurality of tubular distributing arms joined to and radiating from said hollow unit for rotation in one direction therewith and positioned superjacent the floor and each arm having a bottomless terminal length and at least one side terminating a distance short of the floor to form with the floor an outlet passage.

References Cited in the file of this patent

UNITED STATES PATENTS

| | | |
|---|---|---|
| 2,069,989 | Adams | Feb. 9, 1937 |
| 2,225,836 | Lund | Dec. 24, 1940 |
| 2,673,181 | Hughes | Mar. 23, 1954 |
| 2,787,378 | Battey | Apr. 2, 1957 |
| 2,837,215 | Chelminski | June 3, 1958 |